Oct. 18, 1960     J. H. COULLIETTE ET AL     2,956,667
APPARATUS FOR CONVEYING GRANULAR MATERIAL
AROUND AN ARCUATE SECTION OF CONDUIT
Filed Sept. 18, 1958                            2 Sheets-Sheet 1

INVENTOR.
James H. Coulliette
Samuel W. Johnson
BY
*Jennings, Carter & Thompson*
Attorneys

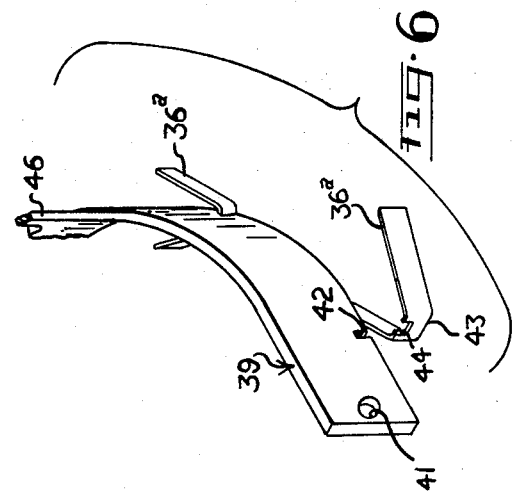
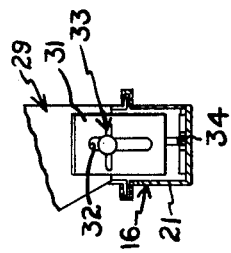
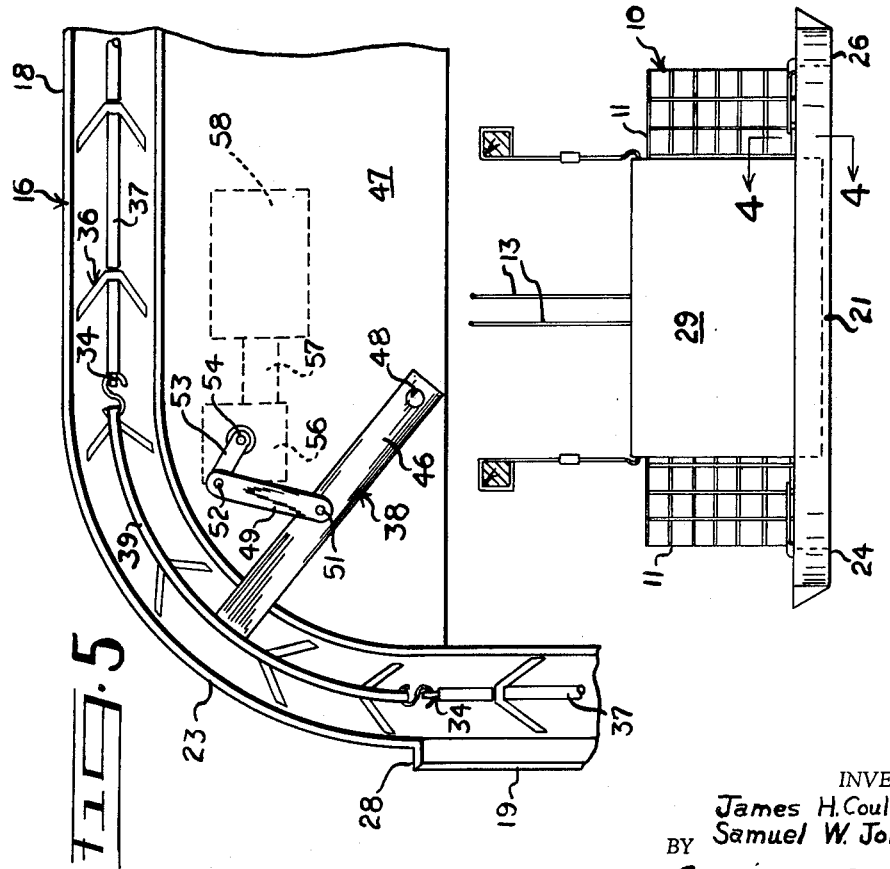
INVENTOR.
James H. Coulliette
Samuel W. Johnson
BY
Attorneys

United States Patent Office 2,956,667
Patented Oct. 18, 1960

2,956,667

APPARATUS FOR CONVEYING GRANULAR MATERIAL AROUND AN ARCUATE SECTION OF CONDUIT

James H. Coulliette, Chattanooga, and Samuel W. Johnson, Tyner, Tenn., assignors to Montgomery and Crawford Co., Inc., a corporation of Delaware Filed Sept. 18, 1958, Ser. No. 761,708

14 Claims. (Cl. 198—56)

This invention relates to apparatus for conveying granular material around an arcuate section of conduit and has for an object the provision of simple and trouble free means for thus conveying materials.

Another object of our invention is to provide apparatus for conveying granular material, such as stock feed, around an arcuate section of conduit in which the material is conveyed by reciprocating impeller members.

Another object of our invention is to provide apparatus of the character designated in which there is no heavy drag along the conduit by the conveying means, thereby reducing to a minimum the wear on the conduit and the conveying members.

A further object of our invention is to provide apparatus of the character designated in which a rocker arm assembly is provided at each corner of a substantially rectangular conduit whereby granular materials, such as stock feed, may be transferred around the corners without excessive accumulation of feed and waste of feed at the corners.

A still further object of our invention is to provide apparatus for conveying granular material around an arcuate section of conduit which shall be simple of construction, economical of manufacture and which shall require a minimum of maintenance to keep the apparatus in satisfactory working order at all times.

Briefly, our improved apparatus for conveying granular material around an arcuate section of conduit comprises an arcuate plate member which is supported by a rocker arm in position to oscillate within the arcuate section of conduit. The rocker arm is pivotally supported at a point substantially equidistant from both ends of the arcuate section of conduit whereby the arcuate plate reciprocates in an arcuate path. A plurality of spaced apart impellers are carried by the arcuate plate and each impeller is provided with at least one inclined surface thereon which is adapted upon movement of the impeller in one direction to push the granular material forward and upon movement in the opposite direction to move relative to the granular material, whereby upon reciprocation of the arcuate member and the impellers carried thereby, the granular material is conveyed around the arcuate section of conduit.

Apparatus embodying features of our invention is illustrated in the accompanying drawings, forming a part of this application in which:

Fig. 3 is an end elevational view showing the opposite end of the row of cages from that shown in Fig. 2;

Fig. 4 is a sectional view, partly in elevation, taken generally along the line 4—4 of Fig. 3;

Fig. 5 is an enlarged plan view of the rocker arm assembly for conveying the granular material around the corners of the trough, together with the means for reciprocating the conveyor; and, Fig. 6 is an enlarged fragmental view showing the manner of attaching the impellers to the arcuate plate of the rocker arm assembly.

Figure 2:
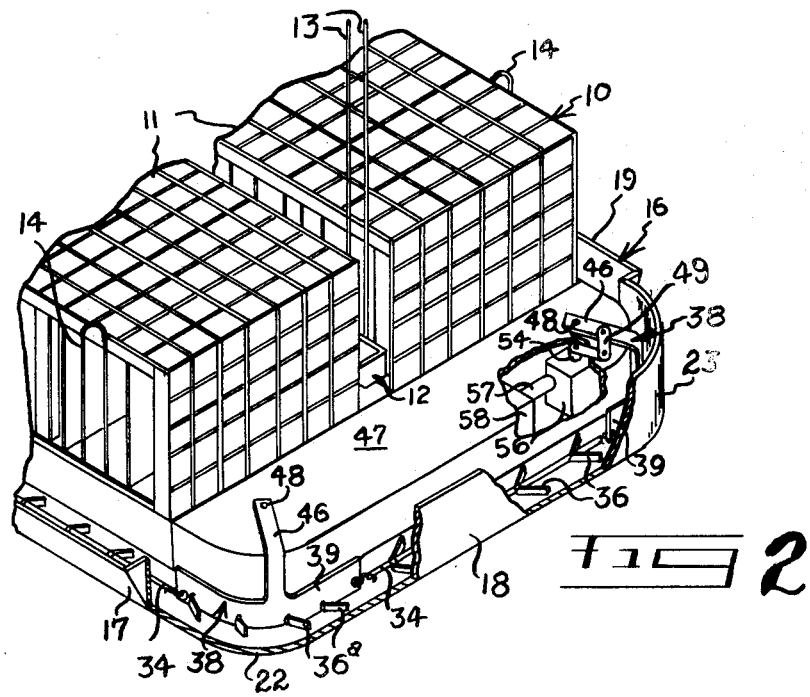
Fig. 2 is an enlarged perspective view, partly broken away and in section, showing one end of the row of cages and the power means for reciprocating the conveyor.
Figure 1:
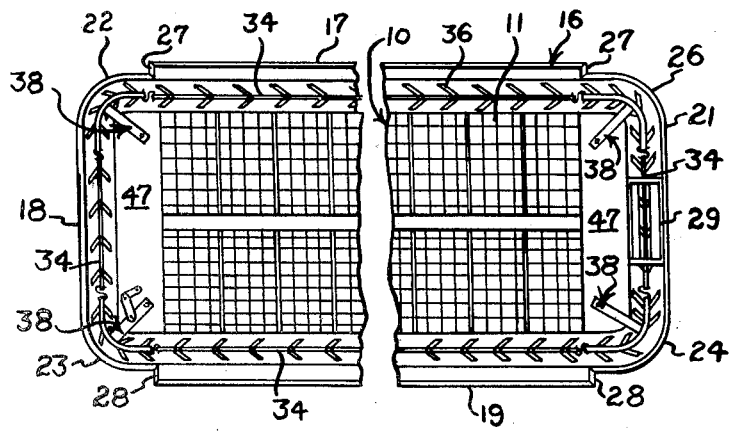
Fig. 1 is a plan view, partly broken away, showing our apparatus associated with a row of laying cages.

Referring now to the drawings for a better understanding of our invention, we show a row of laying cages indicated generally at 10 which comprises a plurality of individual cages 11 which are arranged in back to back relationship with a water trough 12 positioned therebetween. The cages 11 and water trough 12 are supported by hangers 13 which are attached, in a manner well known in the art, to a suitable overhead support member, not shown. As shown in Fig. 2, the cages 11 are provided with the usual sliding doors 14. Surrounding the row of cages 10 and attached thereto by any suitable means is a continuous, open-top feed trough 16 which is in position to afford access by the birds in the cages to the feed contained in the feed trough. As shown in Fig. 1, the trough may be substantially rectangular, as viewed in plan, whereby it is provided with linear sections 17, 18, 19 and 21. The linear sections 17 and 18 are connected to each other by an arcuate section 22. The linear sections 18 and 19 are connected by an arcuate section 23. Connecting the linear sections 19 and 21 is an arcuate section 24 and connecting the linear sections 21 and 17 is an arcuate section 26.

The linear portions 17 and 19, which are positioned in front of the cages 11 may extend outwardly as at 27 and 28, respectively, whereby the cross sectional area of the linear sections 17 and 19 is greater than the cross sectional areas of the linear sections 18 and 21. By providing the outwardly extending sections 27 and 28 for the linear sections 17 and 19, more feed is positioned in easy reach of the birds in the cages 11 and the outer edge of the trough are so positioned that the birds cannot rake feed out of the trough by their beaks.

Feed is supplied to the feed trough 16 by a feed hopper 29 which communicates with the linear section 21 of the feed trough 16. While we have shown the hopper 29 as being positioned over the linear section 21 of the feed trough, it will be apparent that the hopper 29 could be positioned over other sections of the feed trough. The flow of feed from the hopper 29 into the feed trough 16 is regulated by suitable baffle members 31 which are positioned at opposite ends of the hopper 29. As shown in Fig. 4, each baffle member 31 is provided with an elongated slot 32 therein for receiving a bolt and wing nut assembly 33 which is carried by the hopper 29 whereby the vertical position of the baffle member 31 may be adjusted to determine the level of feed in the conduit or feed trough 16.

Feed is conveyed around the feed trough 16 by conveying apparatus now to be described. Extending longitudinally of the central portion of each of the linear sections 17, 18, 19 and 21 are flexible cables 34 which carry a plurality of angular impellers 36 which are preferably V-shaped as viewed in plan, whereby the impellers are provided with surfaces thereon extending in a vertical plane and inclined rearwardly and outwardly from their vertexes with respect to one direction of travel. The impellers 36 are adapted upon movement of the impeller in an opposite direction of travel to push granular material, such as feed, forward along the feed trough and upon movement in the one direction to move relative to the feed. The vertexes of impellers 36 are provided with openings through which the flexible cables 34 pass and the impellers 36 are separated from each other by tubular members 37 which abut the vertexes of the impellers as shown in Fig. 5. The tubular members 37 may be formed of any suitable material, such as plastic or the like. The impellers are separated from each other a distance slightly less than the length of the stroke imparted to the impellers as they are reciprocated, whereby there is an overlap of the distance traveled by adjacent impellers.

To convey the feed around the arcuate sections 22, 23, 24 and 26, we provide rocker arm assemblies 38 now to be described. Each rocker arm assembly 38 comprises an arcuate plate 39 which is of a curvature corresponding to the arcuate sections of the feed trough whereby upon reciprocation of the plate 39 it moves in an arcuate path within the arcuate section of the conduit or trough. Opposite ends of each arcuate plate 39 are connected to the adjacent flexible members 34 which extend longitudinally of the adjacent linear sections of the trough. Suitable openings 41 are provided in the ends of the arcuate plate 39 and the ends of flexible cables or members 34 are looped to provide eyes. A suitable S-shaped hook extends through the openings 41 and the looped ends of the cables to connect cables 34 to arcuate plates 39. If desired, the ends of the cables may be inserted through openings 41 without the use of connecting hooks.

As shown in Figs. 2 and 6, the lower edge of the arcuate plate 39 is provided with a plurality of spaced apart recesses 42 therein for receiving the vertex portion 43 of impellers 36a which are substantially V-shaped, as viewed in plan, whereby they are provided with inclined surfaces which upon movement of the impeller 36a in one direction the feed is moved forward in the arcuate section of the trough and upon movement in the opposite direction the impeller 36a moves relative to the feed whereby the feed is continuously conveyed around the arcuate section upon reciprocating the arcuate plate 39. A suitable notch 44 is provided in the upper surface of the vertex portion 43, as shown in Fig. 6 for engaging the arcuate plate 39 whereby the coaction of the recesses 42 and 44 holds the impellers 36a in place as the arcuate plate 39 is reciprocated.

Formed integrally with the arcuate plate 39 is an L-shaped arm 46 which is pivotally connected at the end thereof opposite the arcuate plate 39 to a stationary support member 47. A suitable pivot pin 48 is employed to connect the arm 46 to the member 47 at a point substantially equidistant from both ends of the adjacent arcuate section of the conduit or feed trough, whereby the arcuate plate is adapted to reciprocate in an arcuate path within the arcuate section of the feed trough. While we have shown the arm 46 as being formed integrally with the arcuate plate 39, it will be apparent that it could be attached to the arcuate plate by other suitable means.

To impart reciprocatory motion to the conveyor, we connect one of the rocker arm assemblies 38 to power means, now to be described. In the drawings, we show the power means as being connected to the rocker arm assembly 38 for the arcuate section 23 of the feed trough 16. A link 49 is pivotally connected at one end by means of a pivot pin 51 to the arm 46. The other end of the link 49 is pivotally connected by means of a pivot pin 52 to a rotary member 53 which may be in the form of an arm connected to a shaft 54 of a speed reduction unit indicated generally at 56. A shaft 57 connects the speed reduction motor 56 to a motor 58. Accordingly, upon energizing the motor 58, the rotary member 53 is rotated to impart reciprocatory motion to the link 49 and the arm 46 whereby the arcuate plate 39 is reciprocated within the arcuate section 23. In view of the fact that the arcuate plate 39 is connected to the adjacent flexible members 34 of the linear sections 18 and 19, reciprocatory motion is also imparted to these linear sections and the other arcuate and linear sections operatively connected thereto. Accordingly, the motor 58 imparts reciprocatory motion to the entire conveying apparatus which extends throughout the trough 16.

From the foregoing description, the operation of our improved apparatus for conveying granular material, such as feed, around an arcuate section of conduit will be readily understood. The feed is placed in the hopper 29 and the baffle members 31 are adjusted to the proper elevation to determine the level of the feed in the trough 16. Upon energizing the motor 58, the arcuate plates 39 carrying the impellers 36a and the flexible members 34 carrying the impellers 36 are reciprocated whereby the feed is conveyed continuously throughout the conduit 16. Upon movement of the arcuate plate 39 in one direction, the impellers 36a push the feed forward around the arcuate sections and upon movement of the arcuate plate 39 in the opposite direction, the impellers 36a move relative to the feed. Accordingly, upon reciprocation of the arcuate members 39, the feed is conveyed around the arcuate sections 22, 23, 24 and 26 of the feed trough 16.

From the foregoing, it will be seen that we have devised an improved means for conveying granular material around an arcuate conduit. By providing a plurality of impellers which move in an arcuate path around the arcuate sections of the feed trough, the feed is conveyed around the arcuate sections without an excessive accumulation of feed or pile up of feed at the corners of the trough. Accordingly, our improved apparatus not only eliminates waste of feed at the corners of the feed trough, but provides a uniform distribution of the feed throughout the feed trough. Also, by preventing the accumulation of feed at the corners of the feed trough, the entire mass of feed in the feed trough is continuously agitated at all times, thus assuring that fresh feed is continuously supplied to the stock. Furthermore, by mounting a plurality of impellers on the arcuate plate 39 which is carried by the rocker arm, and mounting the rocker arm for pivotal movement, the apparatus is trouble free in operation due to the fact that there are no pulleys, cogs or sprockets around which the flexible cables must pass.

While we have shown our invention in but one form, it will be obvious to those skilled in the art that it is not so limited, but is susceptible of various changes and modifications without departing from the spirit thereof, and we desire, therefore, that only such limitations shall be placed thereupon as are specifically set forth in the appended claims.

What we claim is:

1. In apparatus for conveying granular material around an arcuate section of conduit, an arcuate member within said arcuate section of conduit, an arm connected at one end to said arcuate member and pivotally connected at its other end to a support member at a point substantially equidistant from both ends of said arcuate section of conduit whereby said arcuate member is adapted to reciprocate in an arcuate path within said arcuate section of conduit, a plurality of spaced apart impellers carried by said arcuate member and having at least one substantially vertical surface thereon inclined rearwardly and outwardly with respect to one direction of travel and adapted upon movement of the impeller in an opposite direction to push said granular material forward and upon movement in said one direction to move relative to the granular material, and means for reciprocating said arcuate member whereby the granular material is conveyed around said arcuate section by said impellers.

2. In apparatus for conveying granular material around an arcuate section of conduit as defined in claim 1 in which an actuating link is connected to said arm for reciprocating said arcuate member.

3. In apparatus for conveying granular material around an arcuate section of conduit, an arcuate member within said arcuate section of conduit, an arm connected at one end to said arcuate member and pivotally connected at its other end to a support member at a point substantially equidistant from both ends of said arcuate section of conduit whereby said arcuate member is adapted to reciprocate in an arcuate path within said arcuate section of conduit, at least one linear section of conduit connected to said arcuate section of conduit, a flexible member within said linear section of conduit and extending longitudinally thereof, means operatively connecting the ends of said flexible member to opposite ends of said arcuate member, a plurality of spaced apart impellers carried by said arcuate member and said flexible member, each of said impellers having at least one substantially vertical surface thereon inclined rearwardly and outwardly with respect to one direction of travel and adapted upon movement of the impeller in an opposite direction to push said granular material forward and upon movement in said one direction to move relative to the granular material, and means for reciprocating said arcuate member and said flexible member whereby the granular material is moved forward by said impellers.

4. In apparatus for conveying stock feed along a substantially horizontal open-top conduit affording access by stock to feed contained therein and having at least one arcuate section therein connected at opposite ends to linear sections, means to introduce feed into said conduit, an arcuate member within said arcuate section, an arm connected at one end to said arcuate member and pivotally connected at its other end to a support member at a point substantially equidistant from both ends of said arcuate section whereby said arcuate member is adapted to reciprocate in an arcuate path within said arcuate section, flexible members within said linear sections of the conduit and extending longitudinally thereof, means connecting opposite ends of said arcuate member to the adjacent ends of said flexible members, means operatively connecting the other ends of said flexible members to each other to thereby form an endless member, a plurality of spaced apart impellers carried by said arcuate member and said flexible members, each of said impellers having at least one substantially vertical surface thereon inclined rearwardly and outwardly with respect to one direction of travel and adapted upon movement of the impeller in an opposite direction to push the feed forward and upon movement in said one direction to move relative to the feed, and means for reciprocating said arcuate member and said flexible members whereby the feed is moved forward by said impellers.

5. In apparatus for conveying stock feed as defined in claim 4 in which the flexible members in the linear sections of the conduit are joined to each other and an actuating link is connected to said arm for reciprocating said arcuate member whereby said flexible members are reciprocated upon reciprocation of the arcuate member.

6. In apparatus for conveying granular material around an arcuate section of conduit, an arcuate member within said arcuate section of conduit, an arm connected at one end to said arcuate member and pivotally connected at its other end to a support member at a point substantially equidistant from both ends of said arcuate section of conduit whereby said arcuate member is adapted to reciprocate in an arcuate path within said arcuate section of conduit, a link pivotally connected adjacent one end to said arm intermediate the ends thereof, a rotary member pivotally connected to the other end of said link, means for rotating said rotary member whereby said arcuate member is reciprocated, and a plurality of spaced apart impellers carried by said arcuate member and having at least one vertical surface thereof inclined rearwardly and outwardly with respect to one direction of travel and adapted upon movement of the impeller in an opposite direction to push said granular material forward and upon movement in said one direction to move relative to the granular material, whereby the granular material is conveyed around said arcuate section of conduit.

7. In apparatus for conveying granular material around an arcuate section of conduit, a rigid arcuate member within said arcuate section and conforming generally to the curvature of said arcuate section, an arm connected rigidly at one end to said arcuate member and pivotally connected at its other end to a stationary support member at a point substantially equidistant from both ends of said arcuate section of conduit whereby said arcuate member is adapted to reciprocate in an arcuate path within said arcuate section of conduit, a plurality of spaced apart impellers along said arcuate member having at least one vertical surface thereon inclined rearwardly and outwardly with respect to one direction of travel and adapted upon movement of the impeller in an opposite direction to push said granular material forward and upon movement in said one direction to move relative to the granular material, and means for reciprocating said arcuate member whereby the granular material is conveyed around said arcuate section by said impellers.

8. In apparatus for conveying granular material around an arcuate section as defined in claim 7 in which the arm is formed integrally with the arcuate member.

9. In apparatus for conveying granular material around an arcuate section as defined in claim 7 in which the arcuate member is in the form of a vertically extending arcuate plate having recesses in the lower surface thereof for receiving the impellers.

10. In apparatus for conveying stock feed along a substantially horizontal open-top conduit affording access by stock to feed contained therein and having a plurality of arcuate sections therein connected by linear sections, means to introduce feed into said conduit, an arcuate member within each arcuate section, an arm for each arcuate member connected at one end to said arcuate member and pivotally connected at its other end to a stationary support member at a point substantially equidistant from both ends of the adjacent arcuate section whereby each arcuate member is adapted to reciprocate in an arcuate path within its arcuate section of conduit, flexible members within said linear sections of conduit and connected to adjacent arcuate members, a plurality of spaced apart generally V-shaped impellers carried by said arcuate members and said flexible members at the vertexes of the impellers, each of said impellers having two vertical surfaces thereon inclined rearwardly and outwardly with respect to one direction of travel and adapted upon movement of the impeller in an opposite direction to push the feed forward and upon movement in said one direction to move relative to the feed, and means for reciprocating said arcuate members and said flexible members whereby the feed is moved forward by said impellers.

11. In apparatus for conveying stock feed as defined in claim 10 in which the conduit is generally rectangular as viewed in plan.

12. In apparatus for conveying granular material around an arcuate section of conduit, a substantially vertically extending arcuate plate within said arcuate section of conduit, an arm connected at one end to said arcuate plate and pivotally connected to its other end to a support member at a point substantially equidistant from both ends of said arcuate section of conduit whereby said arcuate plate is adapted to reciprocate in an arcuate path within said arcuate section of conduit, means connecting a plurality of V-shaped impellers as viewed in plan to said arcuate plate adjacent the lower edge thereof and in spaced relation to each other, each of said impellers having two vertical surfaces thereon inclined rearwardly and outwardly with respect to one direction of movement and adapted upon movement of the impeller in an opposite direction to push said granular material forward and upon movement in said one direction to move relative to the granular material, and means to reciprocate said arcuate plate whereby the granular material is conveyed around said arcuate section.

13. In apparatus for conveying granular material around an arcuate section of conduit as defined in claim 12 in which the lower edge of the arcuate plate is provided with recesses therein for receiving the impellers and each impeller is provided with a complementary recess adjacent the vertex thereof for receiving said plate at its recesses whereby the impellers are attached to said plate.

14. In apparatus for conveying granular material around an arcuate section of conduit as defined in claim 12 in which the arcuate plate is formed integrally with the arm.

References Cited in the file of this patent

UNITED STATES PATENTS

| | | |
|---|---|---|
| 1,689,839 | Parker | Oct. 30, 1928 |
| 2,681,132 | Knutson | June 15, 1954 |